(12) United States Patent
Hestetun

(10) Patent No.: US 11,384,618 B2
(45) Date of Patent: Jul. 12, 2022

(54) CONNECTION SYSTEM FOR A MULTI-BORE FLYING LEAD OR UMBILICAL

(71) Applicant: Vetco Gray Scandinavia AS, Sandvika (NO)

(72) Inventor: Steinar Lindemann Hestetun, Sandvika (NO)

(73) Assignee: Vetco Gray Scandinavia AS, Sandvika (NO)

( * ) Notice: Subject to any disclaimer, the term of this patent is extended or adjusted under 35 U.S.C. 154(b) by 0 days.

(21) Appl. No.: 16/476,331

(22) PCT Filed: Jan. 5, 2018

(86) PCT No.: PCT/EP2018/050248
§ 371 (c)(1),
(2) Date: Jul. 8, 2019

(87) PCT Pub. No.: WO2018/127552
PCT Pub. Date: Jul. 12, 2018

(65) Prior Publication Data
US 2019/0352993 A1 Nov. 21, 2019

(30) Foreign Application Priority Data
Jan. 6, 2017 (NO) .................................. 20170025

(51) Int. Cl.
*E21B 33/038* (2006.01)
*E21B 41/10* (2006.01)
*E21B 43/013* (2006.01)

(52) U.S. Cl.
CPC .......... *E21B 33/0385* (2013.01); *E21B 41/10* (2013.01); *E21B 43/013* (2013.01)

(58) Field of Classification Search
CPC .... E21B 33/0385; E21B 41/10; E21B 43/013; F16L 37/56
See application file for complete search history.

(56) References Cited

U.S. PATENT DOCUMENTS

2001/0034153 A1 10/2001 McIntosh
2007/0227740 A1* 10/2007 Fontenette ............ E21B 33/038
166/344

(Continued)

FOREIGN PATENT DOCUMENTS

GB 2442104 A 3/2008
WO WO-8803596 A1 * 5/1988 ......... E21B 33/0355
WO 2009082240 A1 7/2009

*Primary Examiner* — James G Sayre
(74) *Attorney, Agent, or Firm* — Baker Hughes Patent Organization

(57) ABSTRACT

An umbilical termination head (1) for connection of a multi-bore flying lead or umbilical (2) to a structure (10), the flying lead or umbilical comprising multiple conduits (7) leading to couplers (4) being arranged on a connector part (3), the umbilical (2) being provided with an end fitting (9) onto which a bracket arrangement (8, 19, 20) is mounted, the connector part (3) being mounted to a bracket (8) of the bracket arrangement. A guide means (11) is arranged on the bracket (8) in such a way that an interacting guide means (12) on the structure (10) lead the umbilical termination head (1) onto the structure (10) for connection of the couplers (4) to corresponding couplers (6) on the structure (10).

9 Claims, 2 Drawing Sheets

(56) References Cited

U.S. PATENT DOCUMENTS

Figure 1:
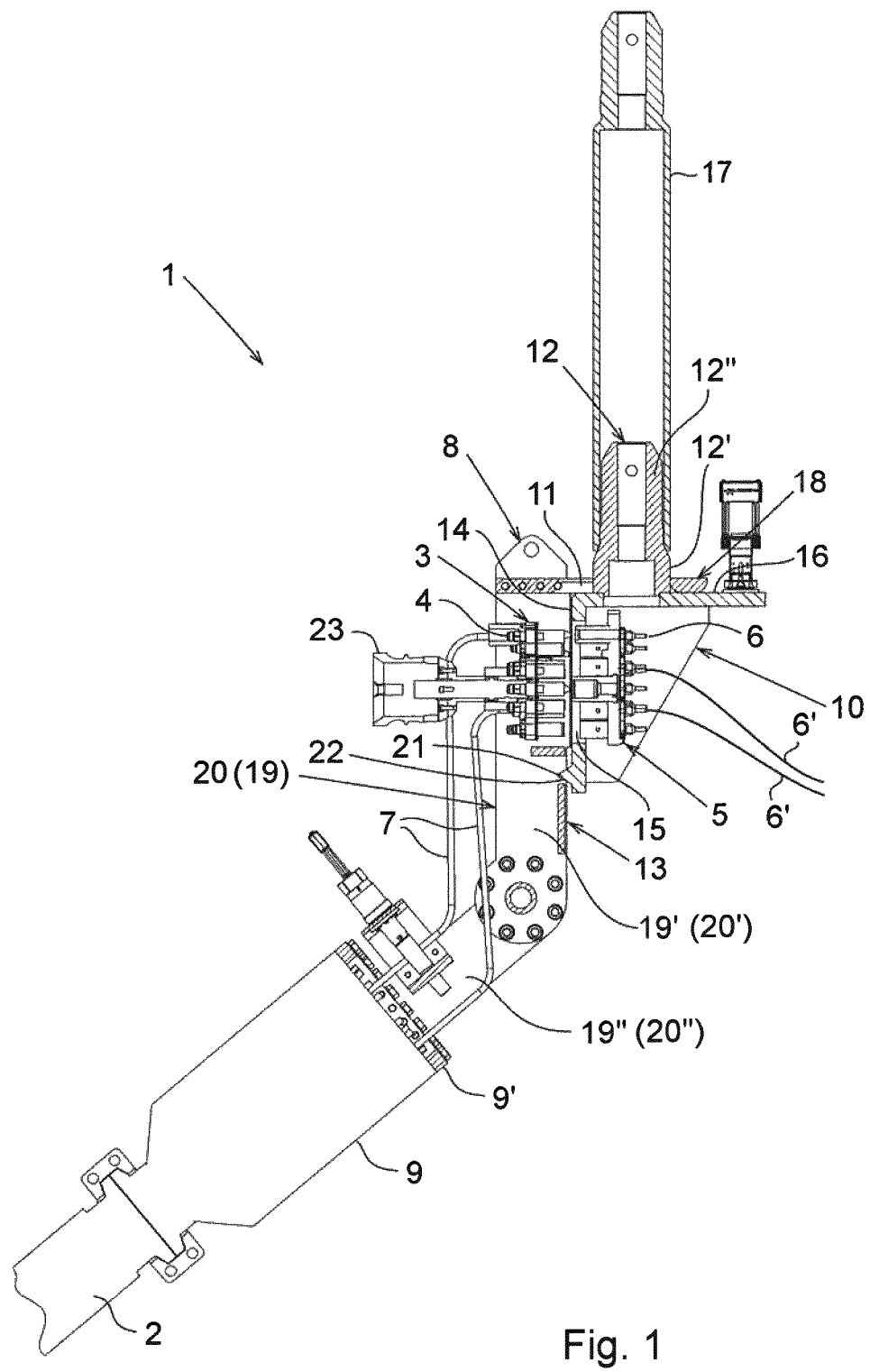

| | | |
|---|---|---|
| 2010/0059229 A1 | 3/2010 | Smith |
| 2012/0141212 A1* | 6/2012 | Long .................. E21B 41/10 405/190 |
| 2013/0240213 A1* | 9/2013 | Larsson ............... E21B 41/10 166/342 |

* cited by examiner

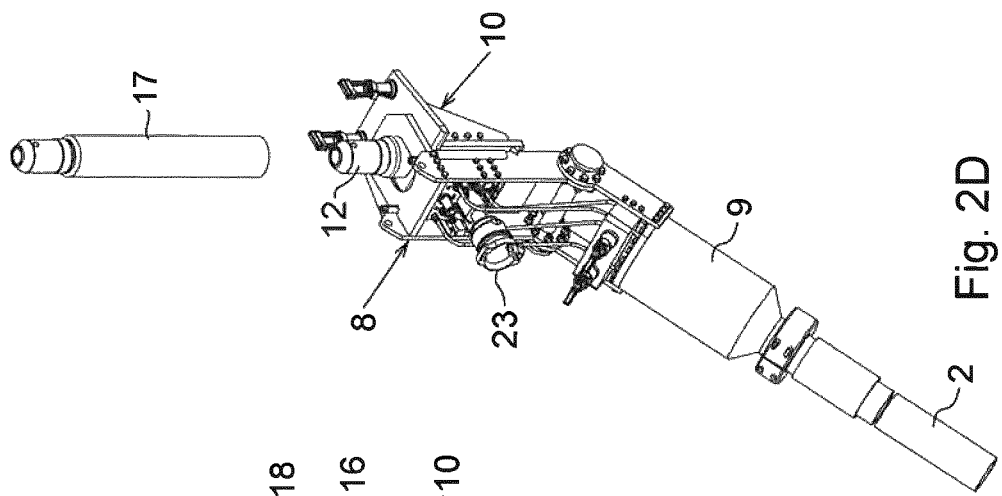
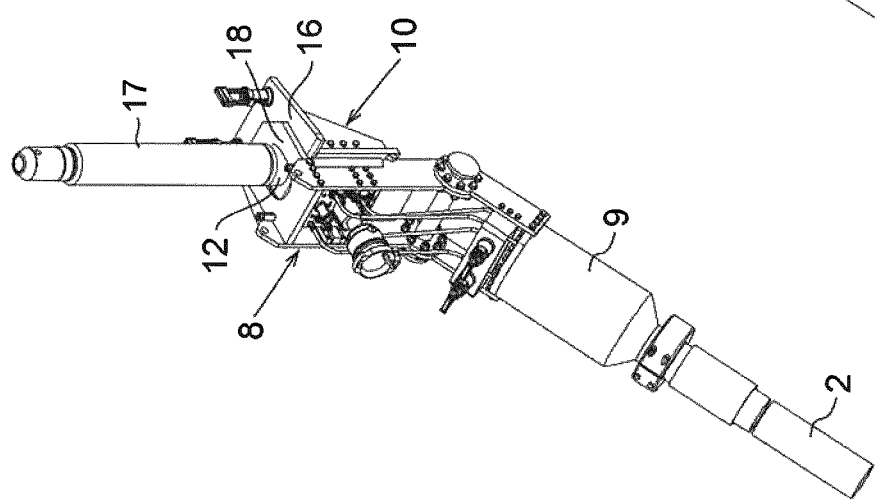
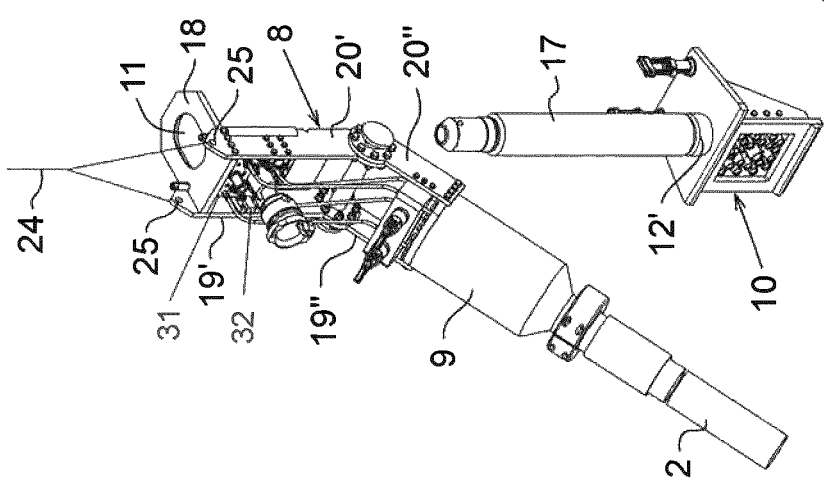
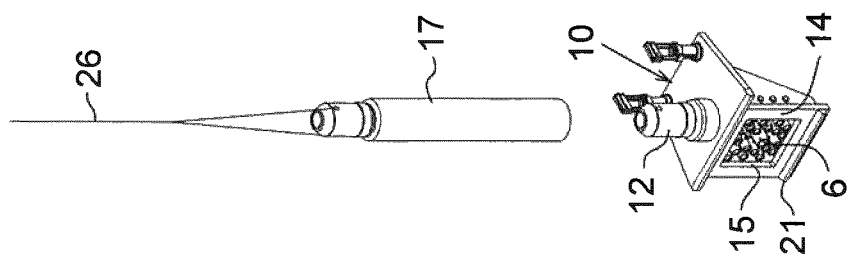

CONNECTION SYSTEM FOR A MULTI-BORE FLYING LEAD OR UMBILICAL

TECHNICAL FIELD OF THE INVENTION

The present invention relates to a termination head and a connection system for a multi-bore flying lead or umbilical, the connection system comprising a first connector part having a number of couplers associated with internal conduits of the multi-bore flying lead or umbilical, a second connector part having a corresponding number of couplers associated with internal conduits of a subsea structure, wherein in a mating position between the first and second connector parts, the first connector part can be pulled towards the second connector part for connection of said couplers.

BACKGROUND AND PRIOR ART

In the subsea industry, a connector or termination head for the subject purpose is often referred to as a "Cobra Head". A "Cobra Head" is a device which provides termination and tying-in of a flying lead or umbilical between subsea equipment such as between the subsea umbilical termination assembly (SUTA) and a subsea distribution unit (SDU), a Christmas tree (XT), a manifold or flow-base structure, etc. A cobra head is outfitted with a number of wet-matable couplers corresponding to the number of conduits in the flying lead or umbilical. The couplers are assembled in a multiple quick connection (MQC) plate, also referred to as an outboard or flying MQC plate, which can be pulled in and coupled to a corresponding MQC plate which is mounted stationary inboard of the subsea equipment. Connection is typically accomplished by means of an ROV (remotely operated vehicle) operated flying lead orientation tool (FLOT)/torque tool that positions and engages the coupler plates to pull them together in a rotary motion of the tool. The term cobra head originates from the appearance of a flying lead lying on the seafloor when the flying MQC plate is lifted by the ROV assisted by a buoyancy element for coupling with the fixed MQC plate, thus reminding of the appearance of a striking cobra.

A prior example of a "Cobra Head" can be seen in US 2010/0059229 A1. This document discloses a connector device wherein MQC plates of different brands, sizes or designs can be attached to the frame structure of the "Cobra Head" using exchangeable interface elements. US 2010/0059229 A1 also explains the predominantly used method for positioning the MQC plates into mating position upon connecting, a method which includes flying the cobra head into position using an ROV which is assisted by a buoyancy aid that is temporary or permanently attached to the flying lead end.

Regardless of being permanently attached or detachable, the float that provides buoyancy to the flying lead end for mating the MQC plates occupies a volume that reduces the available space for ROV manoeuvres and increases drifting caused by underwater currents.

Another drawback in prior art "Cobra Head" connection systems is that all forces from the "Cobra Head" and flying lead/umbilical goes directly or partly through the MQC plates.

SUMMARY OF THE INVENTION

It is an object of the present invention to provide a termination head and a connection system for a multi-bore flying lead or umbilical which avoid the drawbacks of prior art cobra head connection systems.

It is a special object of the present invention to provide a flying lead or umbilical termination head and connection system which avoid the need for bulky floats to fly the connector parts into a mating position.

It is another special object of the present invention to provide a flying lead or umbilical termination head and connection system by which the connector parts are relieved from forces resulting from the structural weight of the flying lead or umbilical in connected mode.

One or several of these objects will be met in a termination head and connection system for a multi-bore flying lead or umbilical as described below.

It is described a termination head for connection of a multi-bore flying lead or umbilical to a structure, the flying lead or umbilical comprising multiple conduits leading to couplers being arranged on a connector part, the flying lead or umbilical being provided with an end fitting onto which a bracket arrangement is mounted, the connector part being mounted to a bracket of the bracket arrangement, wherein a guide means is arranged on the bracket in such a way that an interacting guide means on the structure lead the umbilical termination head onto the structure for connection of the couplers to corresponding couplers on the structure.

The guide means is arranged to simplify lowering of the umbilical termination head onto a fixed structure on the seabed. Here, the structure referred to is fixed to or part of an larger structure being supplied with power, hydraulic or other through the umbilical.

The guide means can be arranged on a surface or plate of the umbilical termination head mating with a surface or plate on the structure to enable guidance of the termination head of the flying lead or umbilical as it is descended down and connected to a subsea structure. It should be noted that the term "umbilical termination head" encompasses termination heads for any flying lead, umbilical or other multibore cable and is used for simplicity in this description.

The connector part of the umbilical termination head may comprise a plate holding the couplers, the plate being slidably connected to the bracket, the sliding motion being limited by stop means.

When the couplers on the connector part are free to move to a limited extent, the surrounding structure take up forces passing through the seabed structure, connection system and umbilical termination head instead of putting load on the couplers. As the couplers can be considered as weak parts in the overall system, it is an advantage to avoid forces and loads on these parts.

The connector part of the umbilical termination head may be provided with a set of grooves recesses in two or more edges or sides of the plate. The bracket will then be provided with a set of rails, the rails fitting in the recesses of the plate, thereby enabling a sliding movement of the plate relative to the bracket.

The connector part could also be provided with a set of rails in two or more sides, the other of the bracket then being provided with a set of grooves, the rails fitting in the grooves, thereby enabling a sliding movement of the plate relative to the bracket between the stop means.

The grooves can be made by fastening crossbars to the inner surfaces of the bracket, machining a groove into the inner surfaces of the bracket or machining grooves or recesses into the sides of the plate of the connector part.

To ensure that the plate is held in the bracket, stop means may be arranged on the bracket, plate and/or rails to limit the sliding movement.

With the above described sliding arrangement, the plate will be movably connected to load bearing structure, thereby avoiding excessive load on essential parts such as the couplers.

The bracket arrangement of the umbilical termination head may comprise a distal leg portion pivotably connected to a proximal leg portion, the distal leg portion being connected to the bracket and the proximal leg portion being connected to an end fitting of the multi-bore flying lead or umbilical.

The provision of a "knee" in the bracket arrangement, enables adjustment of the umbilical termination head and connection system relative to the umbilical or flying lead. This could for example be relevant if there is movement in the subsea structure or umbilical, to optimize the angle between the umbilical and subsea structure before connection, or to adjust the angle between umbilical and subsea structure after connection if there is some sort of misalignment as the exit angle of the umbilical or conduit can be adjusted. In one embodiment, the connection system comprises a first connector part having a number of couplers associated with internal conduits of the multi-bore flying lead or umbilical. A second connector part has a corresponding number of couplers associated with internal conduits of a subsea structure. The first connector part is suspended floating in the free ends of associated conduits, said conduits extending non-constrained from the end of the multi-bore flying lead or umbilical into a bracket that is anchored in said end of the flying lead or umbilical. The second connector part is mounted stationary in a holding fixture. The holding fixture being part of the subsea structure or being attached to the subsea structure.

In a mating position the first connector part can be pulled towards the second connector part for connection due to an inherent flexibility in the non-constrained conduits within the bracket.

It is thereby also described a connection system for a multi-bore flying lead or umbilical, the connection system comprising a first connector part having a number of couplers, a second connector part having a corresponding number of couplers, wherein the first connector part is suspended in ends of associated conduits, the conduits are extending from one end of the multi-bore flying lead or umbilical into the couplers arranged in the first connector part, and wherein the second connector part is mounted stationary in a holding fixture, and further wherein in a mating position the first connector part can be pulled towards the second connector part for connection, wherein interacting guide means are arranged on the holding fixture and on a bracket that is anchored in said one end of the flying lead or umbilical respectively, to bring the first and second connector parts into mating position through a guided, relative motion.

The interacting guide means have the combined benefit of simplifying the connection process and transferring load from the umbilical termination head to a separate holding structure.

In some embodiments of the above system, the first connector part is suspended floating in free ends of associated conduits, said conduits extending non-constrained from the end of the multi-bore flying lead or umbilical into the bracket.

In some embodiments of the above connection system, the interacting guide means is arranged to bring the first and second connector parts into mating position through a descending motion of the first connector part onto the second connector part.

More specifically, in some embodiments the interacting guide means are arrangeable on the bracket and on the holding fixture respectively, to bring the first and second connector parts into mating position through a guided, relative motion, especially through a guided vertical relative motion.

In other words, the umbilical termination head will be mated through a descending or lowering motion without any need for buoyancy equipment, and without requiring heavy ROV work. Hanging from a crane on a surface vessel, the first and flying connector part only requires ROV observation or assistance to bring the guiding means into alignment, where after gravity is allowed to pull the lowered flying umbilical termination head into mating position with the fixed connector part.

It will be realized that the interacting guide means can be differently structured as long as they provide in cooperation a controlled relative motion which is positively stopped as the lowering connector part reaches the mating position. For example, an interacting guide means for controlling the lowering motion can be arranged in the form of a linear guide track on one of the connector parts engaged by a guide pin arranged on the other connector part. Thus, in accordance with the present invention, the "cobra head" is urged into position for connection by the influence of gravity and the geometric design of the two meeting parts.

In one embodiment, at least one eye is formed on the bracket and arranged for insertion from above on at least one upright guide post that rises from the holding fixture. It could also be described as an eye on the bracket being arranged insertable from above on a guide post rising from the holding fixture. The size of the eye could advantageously be larger than the footprint of the guide post to enable angular adjustment between the flying termination head and the guide post during lowering of the termination head onto the fixed structure. This adaption can also enable a limited movement of the bracket relative to the fixed structure after being lowered onto the fixed structure. The curves of the eye are mainly corresponding with the lower radius of the guidepost.

This embodiment is a non-complex solution. The embodiment also facilitates initial alignment of the guide means if the guide post is formed with an introductory or upper length of reduced diameter, thus requiring less precision in the ROV operation for inserting the guide post through the eye.

It should be noted that the bracket and the holding fixture are remained in position by the structure weight of the multi-bore flying lead or umbilical as the eye is fully inserted on the guide post. In some embodiments, the guide post of the above system rises from a top surface adjoining a front face on the holding fixture.

Thus, in one embodiment, the guide post comprises a lower end portion with a larger radius mating with the radius of the eye on the bracket, adjoining an upper end portion of smaller radius. More specifically, the guide post comprises a lower end portion with a first radius, and an upper portion of a second radius, the first radius being larger than the second radius. The upper end portion of smaller radius may be adapted for temporary insertion of a guide post extension over the guide post, in this way extending the guided length of the lowering motion. Thereby, a guide post extension is insertable over the guide post. This auxiliary guide post prolongs the connecting interface between the cobra head of the flying lead or umbilical and the subsea structure to which the flying lead or umbilical will be connected, thereby facilitating navigating of the first connector part onto the second connector part, the second connector part being part of the subsea structure.

In mating position, the second connector part is accessible for connection via a window that is formed in a front face of the holding fixture. A top surface adjoining the front face supports the lower end of the guide post.

With a view to the bracket of the system, in some embodiments, the bracket comprises a distal leg portion connected pivotally to a proximal leg portion, the latter fixedly connected to an end fitting of the multi-bore flying lead or umbilical.

The bracket comprises a front face which is oriented oppositely to the front face of the holding fixture as the eye is fully inserted on the guide post.

In some embodiments of the system, the eye is formed in a plate-like bracket member protruding from the distal end of the bracket to be received in overlapping relation with the top surface of the holding fixture in mating position. The plate-like bracket member will take load from the couplers area of the connection system and transfer it to a less critical part of the subsea structure, i.e. the top surface of the structure.

A lug, protruding in the front face of the holding fixture, may be arranged to engage a seat that is formed in the opposite face of the bracket. In mutual engagement, the lug and seat provide confirmation that the connector parts have reached the mating position. In other words, wherein the lug in the front face of the holding fixture protrudes for engagement with a seat formed in an opposite front face of the bracket in the mating position.

The eye can be formed in a bracket member that connects the upper ends of two adjoining legs of the bracket. Each leg of the bracket comprising a distal leg portion connectable to a proximal leg portion at an adjustable intermediate angle, the proximal leg portion being fixedly connected to an end fitting of the multi-bore flying lead or umbilical.

The connecting bracket member that forms the eye can a plate which reaches forward from the distal end of the bracket to be received in overlapping relation with the top surface of the holding fixture in the mating position.

From the above it will be realized that all structural load and external forces are taken up by the landing interface as the bracket is landed on the holding fixture, thus relieving the connector parts, or the MQC plates, from external forces and structural loads.

SHORT DESCRIPTION OF THE DRAWINGS

In the following, embodiments of the invention will be more closely described with reference made to the drawings. In the drawings:

FIG. 1 is a partly sectioned elevational view of the connection system in mating position and in non-connected mode, and FIGS. 2A-2D illustrate the sequential steps in a process for mating a moving connector part with a stationary connector part of the present connection system.

DETAILED DESCRIPTION OF PREFERRED EMBODIMENTS

For the purpose of disclosure, a multi bore flying lead or umbilical shall be understood as a flexible or semi-flexible multi-conduit structure designed to convey fluids, electricity or optical signals through internal tubing or cables between items of subsea equipment. The couplers mentioned in the disclosure and claims can thus either be hydraulic/pneumatic couplers, optic couplers or electric couplers. Accordingly, the first and second connector parts can be equipped with either kind of couplers or a mix of couplers for fluids, electricity or light respectively. However, if not otherwise stated, any mentioning herein of a multi-bore flying lead alone shall be understood to include also a corresponding multi-conduit umbilical as the alternative conveying structure.

In FIG. 1, reference number 1 denotes generally an umbilical termination head of a connection system by which a multi-bore flying lead 2 can be connected to an item of subsea equipment. The subsea equipment in question can be any arbitrary subsea device and its representation is not required in the drawing for the purpose of illustrating the connection system and umbilical termination head 1.

The connector 1 comprises a first flying connector part 3 carrying a number of couplers 4. The couplers 4 are arranged for coupling with corresponding couplers 6 carried on a second fixed connector part 5.

The first connector part 3 is suspended in the ends of conduits (steel tube or flexible hoses) 7 that extend from the end of the flying lead 2 into a bracket 8. The first connector part 3 comprises a plate 31 in which the couplers are attached. In the shown embodiment, the plate is slidably connected to the bracket 8 by means of a set of small rails 32 arranged in a track or groove. In the shown embodiment, the track or groove is made by a set of bars forming the groove therebetween. The crossbars are attached to the bracket 8 and corresponding rails are arranged on each side of the plate 31, see FIG. 2B. To ensure that the plate 31 does not disconnect from the bracket 8, there are stop means arranged on the bracket 8 or connector part 3 preventing the plate 31 from sliding out of the rail-groove connection.

It should be noted that the grooves on the bracket could be machined into the sides of the bracket 8 instead of fastening bars to the inner sides of the bracket. It is also conceivable to arrange the rails on the bracket 8 and form grooves or recesses on the plate 31. In this embodiment, the stop means can be added to the bracket on the end sections of the rails.

The bracket 8 is anchored in a bulk-head plate or an end fitting 9 of the flying lead 2. In the shown embodiment, the bracket 8 is bolted to the rim of an end flange 9' attached in the extreme end of the end fitting 9.

The conduits 7 extend unconstrained within the bracket 8 from the flying lead end 9 to the associated couplers 4 in the first connector part 3. Thus, the first connector part 3 can be regarded as being suspended floating in the free/unconstrained ends of the conduits 7, due to an inherent flexibility in the conduits 7. In this connection, the capacity of "floating" refers to the ability of pulling the first connection part 3 towards the second connector part 4 by the operation of an ROV tool, which can be brought to engage the ROV handle 23 installed on the first connector part 3, while "sliding" refers to the ability of sliding the first connection part 3 within the bracket 8 to a limited extent as described above, as the connection part 3 will slide between stop means. The stop means are not shown on the figures.

The bracket 8 is a structure comprising a couple of parallel legs, 19 and 20, of which only the distant leg 19 is visible in the sectioned drawing of FIG. 1 (see also FIG. 2B). Each leg comprises a distal leg portion 19' or 20' which is pivotally connected to a proximal leg portion 19", 20" under an adjustable intermediate angle. The proximal leg portion 19", 20" is the part of the bracket that is anchored in the end of the umbilical/flying lead.

If the conduits 7 are made in a flexible material such as a polymeric or composite material, the pivotable connection can be adjusted up to submerging of the termination head into water. The pivotable connection makes it possible to adjust the legs 19 and 20 in different angels during transportation and on site for connection to a subsea structure. During transportation, it is an advantage that the legs 19, 20 do not point out in an angle relative to the end fitting 9. However, when the termination head is on site ready to be lowered down onto a subsea structure, it is an advantage to be able to adjust the legs to a precalculated angle based on the conditions on the seabed.

It is also envisageable to enable adjustment of the pivotable connection on the sea bed, e.g. by making a ROV operable locking mechanism for the connection. It will then be possible to adjust the angle of the termination head on the seabed after connection to the subsea structure.

A plate-like bracket member 18 connects the distal ends of the legs 19 and 20. The connecting bracket member 18 extends forward from the legs, defining an eye 11 that forms one part of an interacting guide means that controls the first connector part 3 in a lowering motion that brings the connector parts 3 and 5 into mating position.

The second connector part 5 is stationary mounted in a holding fixture 10 which is secured in the structure of the connectable subsea equipment. Internal conduits 6' of the subsea structure connect to associated couplers 6 in the second connector part 5. The holding fixture 10 has a top surface 16 supporting an upright guide post 12 that forms the other part of the interacting guide means. In the mating position shown in FIG. 1, the eye 11 is fully inserted on the guide post 12, the bracket member 18 landed on the top surface 16 for a load bearing contact at the landing interface 16-18.

The guide post 12 has a lower end portion 12' with a larger radius mainly corresponding with the radius of the eye 11. However, it can be seen on FIGS. 2C and 2D that the opening of the eye 11 is larger than the area or circumference of the lower end portion 12' of the guide post 12, allowing the bracket member 18 to be angularly adjusted or slide to a limited extent in relation to the holding fixture 10. An upper portion 12" of the guide post has a smaller radius adapted for insertion of a guide post-extension 17 over the guide post 12. The guide post extension may be used temporarily during lowering of the bracket and the first connector part 3 if weather conditions or other conditions so require.

In the holding fixture 10, the top surface 16 adjoins a front face 14 facing the bracket 8 with the first connector part 3. A window 15 in the front face 14 provides access to the second connector part 5 for connection of couplers 4 and 6 in the mating position.

In the mating position, the structural weight of the flying lead 2 acts to pull the bracket 8 and the first connector part 3 down, thus maintaining the mating position in which connection can be accomplished. A lug 21 that protrudes in the vertical face 14 of the holding fixture 10 defines the mating position by engagement with a seat 22 formed in the opposite face 13 of the bracket 8, as the faces 13 and 14 are facing each other in the mating position.

The process of mating the connector parts will now be briefly explained with reference to FIGS. 2A-2D. FIG. 2A shows installation of the guide post extension 17 on the guide post 12. In FIG. 2B, the moving connector part is lowered through the water volume hanging from a strap 24 that is connected to eyelets 25 formed in the upper end of the bracket 8. The strap is typically fed out from a vessel on the surface, the lowering motion thus driven by gravity. In FIG. 2C, the bracket 8 has landed on the holding fixture 10, guided in position as the eye 11 slides down along guide post extension 17 and the guide post 12 respectively. Finally, in FIG. 2D, the guide post extension 17 may be detached.

In the mating process, aligning the eye and the guide post/guide post extension can be accomplished using an ROV as the bracket is closing in on the holding fixture. Aligning of the two assemblies may alternatively be accomplished on the surface vessel by insertion of the eye 11 on a lowering line 26 used for installation and retrieval of the guide post extension 17, if appropriate.

The invention claimed is:

1. A connection system comprising:
a first connector part having couplers arranged thereon;
an umbilical termination head for connecting a multi-bore flying lead or umbilical to a structure of a fixed structure, the flying lead or umbilical comprising an end fitting and multiple conduits leading to the couplers arranged on the first connector part;
a second connector part comprising a set of couplers corresponding to the couplers of the first connector part, the second connector part connected to the structure;
a bracket arrangement mounted on the end fitting, wherein the first connector part is mounted to a bracket of the bracket arrangement;
an interacting guide on the structure; and
a guide arranged on the bracket such that the interacting guide on the structure leads the umbilical termination head onto the structure to connect the couplers arranged on the first connector part to corresponding couplers of the second connector part on the structure,
wherein the interacting guide is arranged to bring the first and second connector parts into a mating position through a descending motion of the first connector part,
wherein the first connector part is suspended in free ends of associated conduits of the multiple conduits, the associated conduits extending from the end fitting of the flying lead or umbilical into the bracket, and
wherein an eye on the bracket is insertable on a guidepost rising from the structure.

2. The connection system of claim 1, wherein the connector part comprises a plate holding the couplers of the first connector part, the plate being slidably connected to the bracket.

3. The connection system of claim 2, wherein one of the first connector part and the bracket comprise a set of rails in two or more sides and the other of the first connector part and the bracket is provided with a set of grooves, the rails fitting in the grooves, to enable a sliding movement of the plate relative to the bracket that is limited by a stopper.

4. The connection system of claim 1, wherein the bracket arrangement (comprises a distal leg portion pivotably connected to a proximal leg portion, the distal leg portion connected to the bracket and the proximal leg portion connected to an end fitting of the flying lead or umbilical.

5. The connection system of claim 1, wherein the guidepost rises from a top surface adjoining a front face of the structure.

6. The connection system of claim 5, wherein the guide post comprises a lower end portion with a first radius and a corresponding circumference, and an upper portion of a second radius, the first radius being larger than the second radius, the circumference of the eye on the bracket being larger than the circumference of the lower end portion.

7. The connection system of claim 1, wherein a guidepost extension is insertable over the guidepost.

8. The connection system of claim 1, wherein the eye is formed in a plate-like bracket protruding from the distal end of the bracket, the bracket received in overlapping relation with the top surface of the structure in a mating position.

9. The connection system of claim 8, wherein a lug in a front face of the structure protrudes to engage with a seat formed in an opposite front face of the bracket in the mating position.

* * * * *